8927X
T. D. Burrall,
Cook Stove.
Patented June 20. 1835.
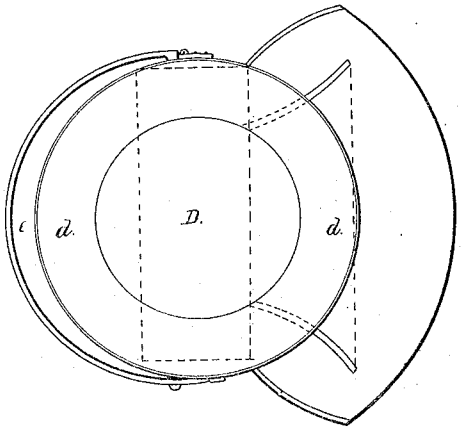
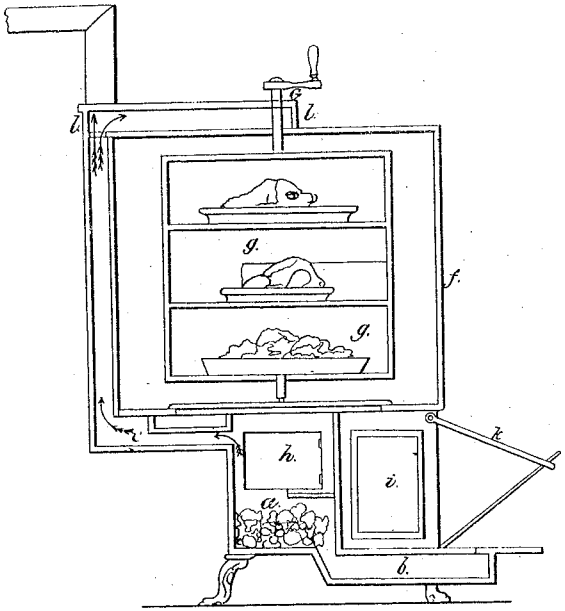
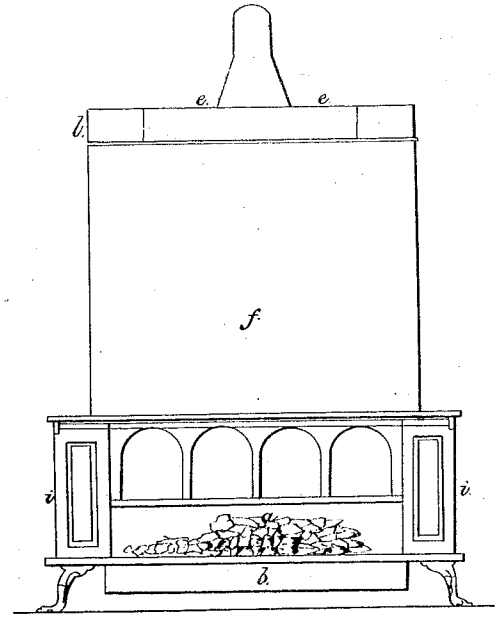

MISSING PAGE TEMPORARY NOTICE

PATENT # 8927 X FOR ISSUE DATE June 26, 1835 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Text.